United States Patent
Bryant et al.

(10) Patent No.: US 9,542,219 B1
(45) Date of Patent: Jan. 10, 2017

(54) AUTOMATIC ANALYSIS BASED SCHEDULING OF JOBS TO APPROPRIATE CLOUD RESOURCES

(71) Applicant: International Business Machines Corporation, Armonk, NY (US)

(72) Inventors: Jay S. Bryant, Rochester, MN (US); James E. Carey, Rochester, MN (US); John M. Santosuosso, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/973,286

(22) Filed: Dec. 17, 2015

(51) Int. Cl.
*G06F 9/455* (2006.01)
*G06F 9/50* (2006.01)

(52) U.S. Cl.
CPC ......... *G06F 9/45558* (2013.01); *G06F 9/5077* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 8,261,295 B1 * | 9/2012 | Risbood | ............. | G06F 8/61 717/177 |
| 8,352,611 B2 * | 1/2013 | Maddhuri | ............. | G06F 9/5005 705/2 |
| 8,452,864 B1 * | 5/2013 | Vendrow | ............. | G06F 8/60 700/99 |
| 8,656,023 B1 * | 2/2014 | Ho | ............. | G06F 9/5072 709/203 |
| 8,862,633 B2 * | 10/2014 | Friedman | ............. | 707/803 |
| 8,886,865 B1 * | 11/2014 | Huang | ............. | G06F 3/0665 711/6 |
| 8,990,809 B1 * | 3/2015 | Jacob | ............. | G06F 9/45533 718/1 |
| 9,043,767 B2 * | 5/2015 | Spivak | ............. | G06F 9/5055 717/148 |
| 9,088,479 B2 * | 7/2015 | Heninger | ............. | H04L 43/04 |
| 9,256,412 B2 * | 2/2016 | Genevski | ............. | G06F 8/60 |
| 9,274,811 B1 * | 3/2016 | Reeves | ............. | G06F 9/445 |
| 2008/0028395 A1 * | 1/2008 | Motta | ............. | G06F 8/65 717/177 |

(Continued)

OTHER PUBLICATIONS

Microsoft, "About Virtual Machine Placement", retrieved Nov. 24, 2015, 2 pages, https://technet.microsoft.com/library/bb740817.aspx.

(Continued)

*Primary Examiner* — Emerson Puente
*Assistant Examiner* — Mehran Kamran
(74) *Attorney, Agent, or Firm* — Patterson+Sheridan, LLP

(57) ABSTRACT

Systems, methods, and computer program products to perform an operation comprising identifying a set of attributes of an application specified in a request to deploy the application in a cloud computing environment, determining a set of dependencies for the application, selecting a first virtual machine format, of a plurality of virtual machine formats, based on the set of attributes and set of dependencies, and deploying the application in a first virtual machine of the first virtual machine format on a host in the cloud computing environment.

17 Claims, 8 Drawing Sheets

(56) References Cited

U.S. PATENT DOCUMENTS

| | | | | |
|---|---|---|---|---|
| 2008/0295090 A1* | 11/2008 | Bestle | G06F 8/65 | 717/170 |
| 2010/0306772 A1* | 12/2010 | Arnold | G06F 8/36 | 718/1 |
| 2011/0138374 A1* | 6/2011 | Pal | G06F 8/67 | 717/169 |
| 2011/0214111 A1* | 9/2011 | Vidal | G06F 8/65 | 717/168 |
| 2011/0231846 A1* | 9/2011 | Sabin | G06F 9/5072 | 718/100 |
| 2012/0131193 A1* | 5/2012 | Ferris | G06F 9/5072 | 709/226 |
| 2012/0131577 A1* | 5/2012 | Arcese | G06F 8/60 | 718/1 |
| 2012/0233625 A1* | 9/2012 | Sabin | G06F 9/5072 | 718/105 |
| 2012/0266169 A1* | 10/2012 | Lagergren | G06F 9/4401 | 718/1 |
| 2012/0284380 A1* | 11/2012 | Anderson, III | H04L 29/06 | 709/223 |
| 2013/0036208 A1* | 2/2013 | Dochez | G06F 9/5077 | 709/220 |
| 2013/0097601 A1* | 4/2013 | Podvratnik | G06F 9/5027 | 718/1 |
| 2013/0185715 A1* | 7/2013 | Dunning | H04L 41/0803 | 718/1 |
| 2013/0232463 A1* | 9/2013 | Nagaraja | G06F 8/61 | 717/101 |
| 2013/0232480 A1* | 9/2013 | Winterfeldt | G06F 8/60 | 717/177 |
| 2013/0232498 A1* | 9/2013 | Mangtani | G06F 9/5072 | 718/104 |
| 2013/0247022 A1* | 9/2013 | DeJana | G06F 8/65 | 717/172 |
| 2013/0297922 A1* | 11/2013 | Friedman | G06F 8/63 | 713/2 |
| 2013/0339424 A1* | 12/2013 | Pasala | G06F 9/5072 | 709/203 |
| 2013/0346945 A1* | 12/2013 | Yousouf | G06F 8/36 | 717/121 |
| 2014/0115161 A1* | 4/2014 | Agarwal | G06F 9/45558 | 709/226 |
| 2014/0137113 A1* | 5/2014 | Bolte | G06F 9/45533 | 718/1 |
| 2014/0137114 A1* | 5/2014 | Bolte | G06F 9/45533 | 718/1 |
| 2014/0229607 A1* | 8/2014 | Jung | H04L 43/0876 | 709/224 |
| 2014/0244791 A1* | 8/2014 | Fellows | H04L 67/06 | 709/217 |
| 2014/0245319 A1* | 8/2014 | Fellows | G06F 8/45 | 718/104 |
| 2014/0282849 A1* | 9/2014 | Collison | H04L 63/08 | 726/1 |
| 2014/0325500 A1* | 10/2014 | Jang | G06F 8/65 | 717/173 |
| 2014/0337833 A1* | 11/2014 | Adogla | G06F 9/45558 | 718/1 |
| 2014/0380308 A1* | 12/2014 | Hassine | G06F 9/45558 | 718/1 |
| 2015/0121370 A1* | 4/2015 | Beisiegel | G06F 9/45558 | 718/1 |
| 2015/0142524 A1* | 5/2015 | Jung | G06Q 30/0206 | 705/7.35 |
| 2015/0186124 A1* | 7/2015 | Hoy | G06F 8/61 | 726/22 |
| 2015/0347264 A1* | 12/2015 | Mohammed | G06F 11/3006 | 714/45 |
| 2015/0370445 A1* | 12/2015 | Wang | G06F 3/0484 | 715/765 |
| 2015/0378702 A1* | 12/2015 | Govindaraju | G06F 8/60 | 717/177 |
| 2016/0092197 A1* | 3/2016 | Kuchibhotla | G06F 8/71 | 717/170 |
| 2016/0098287 A1* | 4/2016 | Prasad | G06F 9/45558 | 718/1 |

OTHER PUBLICATIONS

Atlassian Confluence, the Enterprise Wiki, "Analyzing dependencies with Dependency Walker", retrieved Nov. 24, 2015, 11 pages, http://kb.froglogic.com/display/KB/Analyzing+dependencies+with+Dependency+Walker.

S. Benedict et al, "Dependency Checker Tool", The Linux Foundation, retrieved Nov. 24, 2015, 22 pages, http://www.linuxfoundation.org/sites/main/files/publications/lf_foss_compliance_dct.pdf.

* cited by examiner

AUTOMATIC ANALYSIS BASED SCHEDULING OF JOBS TO APPROPRIATE CLOUD RESOURCES

BACKGROUND

The present disclosure relates to cloud computing, and more specifically, to automatic, analysis-based scheduling of jobs to appropriate cloud resources.

In current cloud computing environments, users must know how to select an image and system type to create an instance in the cloud to run their workload (or applications). This requires the user to have knowledge of the cloud topology and associated resources. As cloud computing moves to larger hybrid cloud environments, these problems will only be exacerbated. In addition, heterogeneous clouds that combine different types of hardware, software, and add-ons will further complicate user attempts to deploy their applications. Existing schedulers assume a homogeneous hardware environment with an appropriately pre-compiled binary file for the application.

SUMMARY

According to one embodiment of the present disclosure, a method comprises identifying a set of attributes of an application specified in a request to deploy the application in a cloud computing environment, determining a set of dependencies for the application, selecting a first virtual machine format, of a plurality of virtual machine formats, based on the set of attributes and set of dependencies, and deploying the application in a first virtual machine of the first virtual machine format on a host in the cloud computing environment.

According to another embodiment of the present disclosure, a system comprises a processor and a memory including a program which when executed by the processor, performs an operation comprising identifying a set of attributes of an application specified in a request to deploy the application in a cloud computing environment, determining a set of dependencies for the application, selecting a first virtual machine format, of a plurality of virtual machine formats, based on the set of attributes and set of dependencies, and deploying the application in a first virtual machine of the first virtual machine format on a host in the cloud computing environment.

According to another embodiment of the present disclosure, a computer program product comprises a computer-readable storage medium having computer-readable program code embodied therewith, the computer-readable program code executable by one or more computer processors to perform an operation comprising identifying a set of attributes of an application specified in a request to deploy the application in a cloud computing environment, determining a set of dependencies for the application, selecting a first virtual machine format, of a plurality of virtual machine formats, based on the set of attributes and set of dependencies, and deploying the application in a first virtual machine of the first virtual machine format on a host in the cloud computing environment.

DETAILED DESCRIPTION

Embodiments disclosed herein enhance job schedulers in cloud computing environments to provide automatic, analysis-based scheduling of jobs to appropriate cloud resources. Specifically, the schedulers analyze the binary (e.g., an executable file or installer package) that the user wishes to run in the cloud computing environment, and schedule the binary to run on appropriate resources in a heterogeneous cloud. When receiving a request to deploy an application to the cloud, embodiments disclosed herein analyze the binary to determine dependencies, version information, support information, required operating systems, availability of the operating system in the cloud, resource use of the host systems in the cloud, and the like. Embodiments disclosed herein may select a target deployment based on the analysis of the application as well as support for the application, bug issues, version information, ease of installation, corporate restrictions, past use by the user, and deployment history for the application in the cloud.

As used herein, an "application" may refer to any executable program code, such as a job, workload, service, task, script, and the like, and may be of any suitable format, such as a binary file, executable, installer package, image, and the like.

Figure 1:
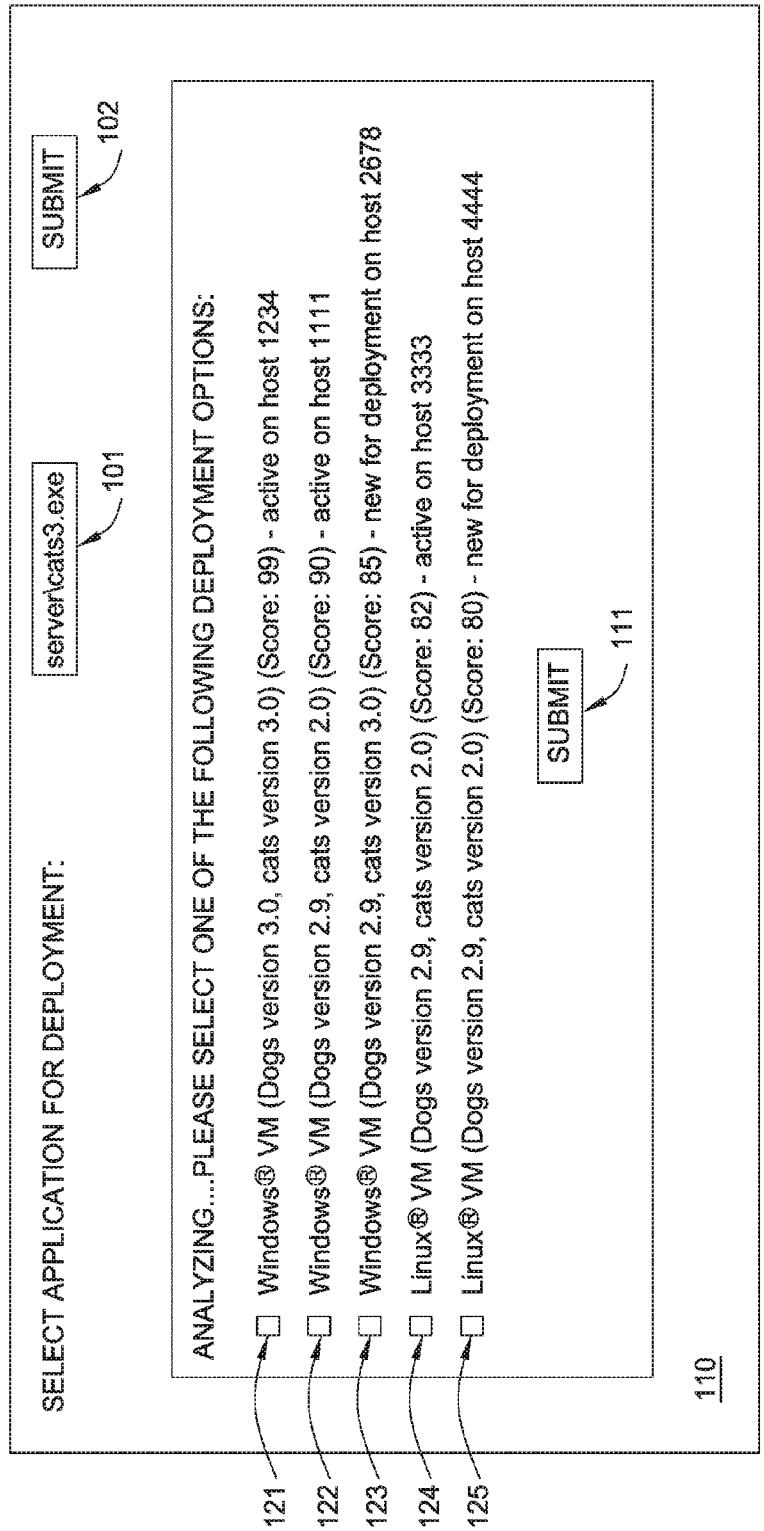
FIG. 1 depicts a graphical user interface configured to provide automatic, analysis-based scheduling of jobs to appropriate cloud resources, according to one embodiment.

FIG. 1 depicts a graphical user interface (GUI) 100 configured to provide automatic, analysis-based scheduling of jobs to appropriate cloud resources, according to one embodiment. As shown, the user interface 100 includes an input box 101 where a user may specify an application the user wishes to deploy in a cloud computing environment. As shown, the user has specified "server\cats3.exe" which is an example application that the user may provide using the submit button 102.

In a large hybrid cloud, a variety of resources are available. Specifically, different types of hardware platforms and/or software platforms (e.g., virtual machines) are available at any given time. When the user submits the request to deploy an application, numerous possible deployments exist. Therefore, when the user submits the request to deploy "cats3.exe," embodiments disclosed herein may analyze the application, the cloud computing environment, and a number of other factors to determine a number of candidate deployments for the application.

As shown, the GUI 100 includes a box 110 that includes a set of candidate deployment options 121-125. As shown, each candidate deployment option 121-125 is ranked based on a score, and includes additional data that may assist the user in selecting one of the candidate deployment options 121-125. For example, as shown, candidate deployment 121 is a Windows® virtual machine (VM) that is active on computing host 1234. In the analysis of the application, embodiments disclosed herein may identify dependencies for the application. The dependencies may include other libraries, applications, and the like. As shown, for example, the "cats" application has "dogs" as a dependency. Therefore, as shown, the candidate options 121-125 specify which version of dogs and cats would be deployed with each option. For example, candidate deployment 121 currently includes cats version 3.0 (which may match the requested version of the cats application reflected in the filename cats3.exe provided by the user) and dogs 3.0. Similarly, candidate deployment 123 includes cats version 3.0 and dogs version 2.9. However, as shown, candidate deployment 123 is not currently active, and would need to be deployed on host 2678. Generally, the versions depicted in the candidate deployments 121-125 may depict existing versions of software on currently deployed virtual machines, or the versions of software that may be installed on new or currently deployed virtual machines.

As shown, each candidate deployment 121-125 is associated with a respective score. Embodiments disclosed herein may score the candidate deployments based on any number of factors. In the example shown in FIG. 1, the scores may be based on whether the candidate deployment is currently active and deployed (or would need to be deployed on a host), the versions of the application (and/or any dependencies), the operating system of the target deployment, and the availability of the application. For example, candidate deployments 124,125 have the lowest scores because the specified operating system is not compatible with the provided cats.exe file. As such, embodiments disclosed herein may compute a lower score for deployments 124, 125, as a compatible version of the cats application (and/or the dogs application) would need to be downloaded. Furthermore, corporate restrictions may affect the scores. For example, the Windows version of the cats application may be required by a corporate policy, while version 3.0 of the dogs application may be required by the corporate policy. Therefore, as shown, candidate deployment 121 has the highest score, as it has versions 3.0 of dogs and cats, is a Windows VM, and is active in the cloud.

As shown, the user may select one of the candidate deployments 121-125, and submit the selection using the submit button 111. Once the user submits a selection, embodiments disclosed herein may schedule the cats application to be run on the selected deployment. In at least one embodiment, however, the scheduling system automatically selects the highest ranked deployment, without requiring user selection of a candidate deployment 121-125.

Figure 2:
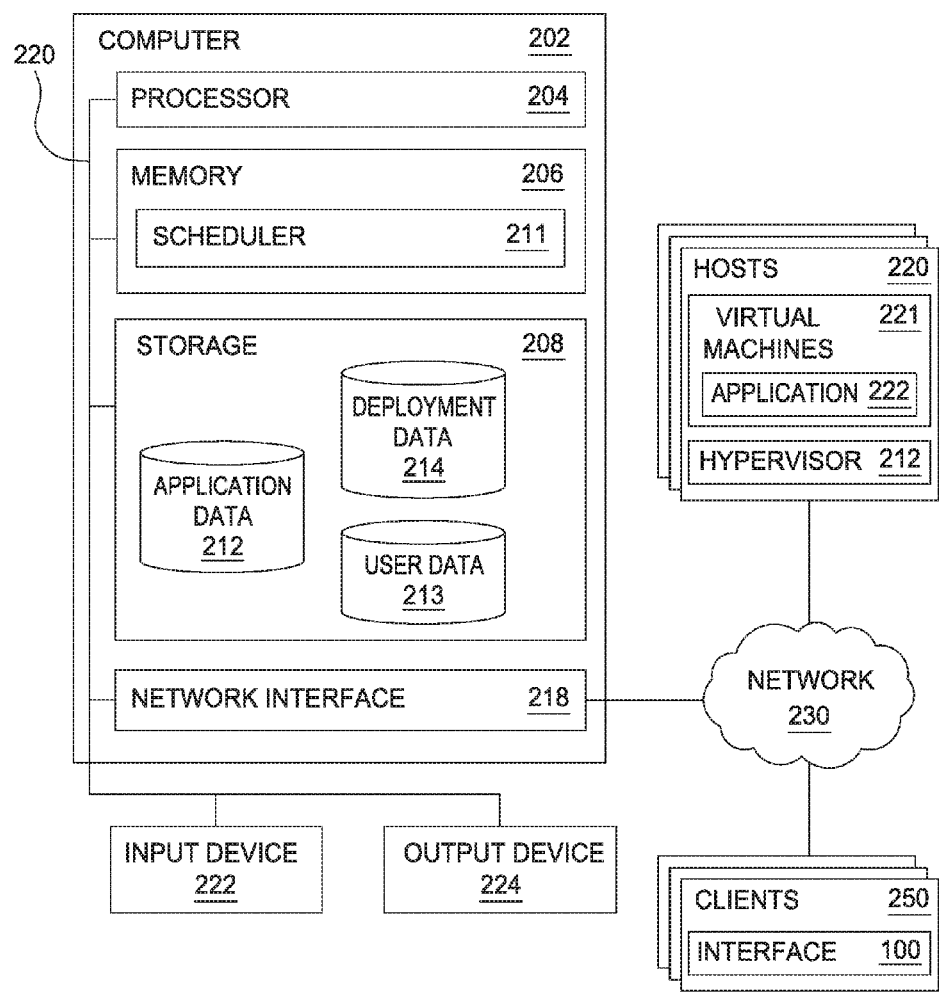
FIG. 2 depicts a cloud computing environment configured to provide automatic, analysis-based scheduling of jobs to appropriate cloud resources, according to one embodiment.

FIG. 2 depicts a cloud computing environment 200 configured to provide automatic, analysis-based scheduling of jobs to appropriate cloud resources, according to one embodiment. The cloud computing environment 200 includes a computer 202. The computer 202 may also be connected to other computers via a network 230. In general, the network 230 may be a telecommunications network and/or a wide area network (WAN). In a particular embodiment, the network 230 is the Internet.

The computer 202 generally includes a processor 204 which obtains instructions and data via a bus 220 from a memory 206 and/or a storage 208. The computer 202 may also include one or more network interface devices 218, input devices 222, and output devices 224 connected to the bus 220. The computer 202 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 204 is a programmable logic device that performs instruction, logic, and mathematical processing, and may be representative of one or more CPUs. The network interface device 218 may be any type of network communications device allowing the computer 202 to communicate with other computers via the network 230.

The storage 208 is representative of hard-disk drives, solid state drives, flash memory devices, optical media and the like. Generally, the storage 208 stores application programs and data for use by the computer 202. In addition, the memory 206 and the storage 208 may be considered to include memory physically located elsewhere; for example, on another computer coupled to the computer 202 via the bus 220.

The input device 222 may be any device for providing input to the computer 202. For example, a keyboard and/or a mouse may be used. The input device 222 represents a wide variety of input devices, including keyboards, mice, controllers, and so on. Furthermore, the input device 222 may include a set of buttons, switches or other physical device mechanisms for controlling the computer 202. The output device 224 may include output devices such as monitors, touch screen displays, and so on.

As shown, the memory 206 includes a scheduler 211. The scheduler 211 is an application generally configured to schedule applications (or jobs) for processing on a host 220 based at least on an analysis of the application, dependencies of the application, and the resources in the cloud 200. For example, when a user submits an application 222 to the scheduler 220 via the GUI 100 executing on a client machine 250, the scheduler 211 may determine the type of the application 222 (such as via a 'file' command, analysis of the file extension, and the like). By determining the type of the application (such as an .exe file), the scheduler 211 may determine which operating system the application 222 has been compiled to run in. If the appropriate environment does not exist in the cloud 200, the scheduler 211 may automatically create the appropriate environment for the application 222 (e.g., a virtual machine 221 on a host 220).

In addition, when determining what the appropriate environment is for the application 222, the scheduler 211 may consider a plurality of other factors. For example, the scheduler 211 may determine attributes of the application 222 (and different existing versions of the application). For example, the scheduler 211 may determine that the latest version of the application 222 is associated with extensive bugs and has not been updated in many months. In such an example, the scheduler 211 may deploy an older, more stable version of the application 222. As another example, the scheduler 211 may determine that the version of the application 222 for operating system Y has been updated more recently than the version for operating system Z. Therefore, the scheduler 211 may deploy the operating system Y version of the application 222 on an operating system Y virtual machine 221 on a host 220. The scheduler 211 may further consider an ease of installation for the application 222, its dependencies, and a virtual machine 221. For example, if an installation cookbook only exists in one operating system, the scheduler 211 may select this operating system for the deployment. Similarly, if the dependencies are not available on a first operating system, installation would be difficult (or impossible) on the first operating system, and the scheduler 211 would likely not schedule the application 222 on the first operating system. The scheduler 211 may further consider corporate restrictions (such as version x.y being required by a corporate IT policy). The scheduler 211 may consider resource use rates on the hosts 220. For example, the scheduler 211 may deploy the application to a host 220 whose resource utilization is not above a specified threshold.

Further still, the scheduler 211 may reference the user data 213 and the deployment data 214. The user data 213 may specify user preferences for a particular deployment (such as operating system A). The deployment data 214 may track results of past deployments of all applications, and indicate which deployments were successful or unsuccessful. By referencing the deployment data 214, the scheduler 211 may select the deployment which is most likely to be successful. In at least one embodiment, the scheduler 211 may compute a score for each candidate deployment based on any number of the above factors. The scheduler 211 may then rank the candidate deployments and schedule the application to run on the highest-ranking candidate deployment. Alternatively, as depicted in FIG. 1, the ranked list of candidate deployments may be outputted to the user via the GUI 100 for selection.

The hosts 240 are compute nodes configured to execute one or more virtual machines 220. The hosts 240 include a hypervisor 212. Generally, a hypervisor creates, manages, and runs virtual machines on compute nodes. The hypervisors 212 may monitor resource use rates by the virtual machines 220 and report the use rates to the scheduler 211 for storage in the deployment data 214. Generally, a virtual machine is an emulation of a computer system.

As shown, the storage 208 includes the application data 212, user data 213, and deployment data 214. The application data 212 may include executable files for the application (in the event the user does not upload the file from the client 250), attributes of the applications, versions of the applications, and the like. As previously indicated, the scheduler 211 may determine the attributes of the applications by analyzing the application's executable. Some binaries may specify dependencies as metadata, which the scheduler 211 may extract and store in the application data 212. However, for binaries that do not specify dependencies, the scheduler 211 may reference a symbol table for the binary file, and automatically determine the libraries that must be installed on the target virtual machine. The user data 213 may include user preferences and past selected deployment options for a plurality of users. The deployment data 214 includes data describing prior deployments of applications in the cloud 200, and whether each deployment was successful.

Figure 3:
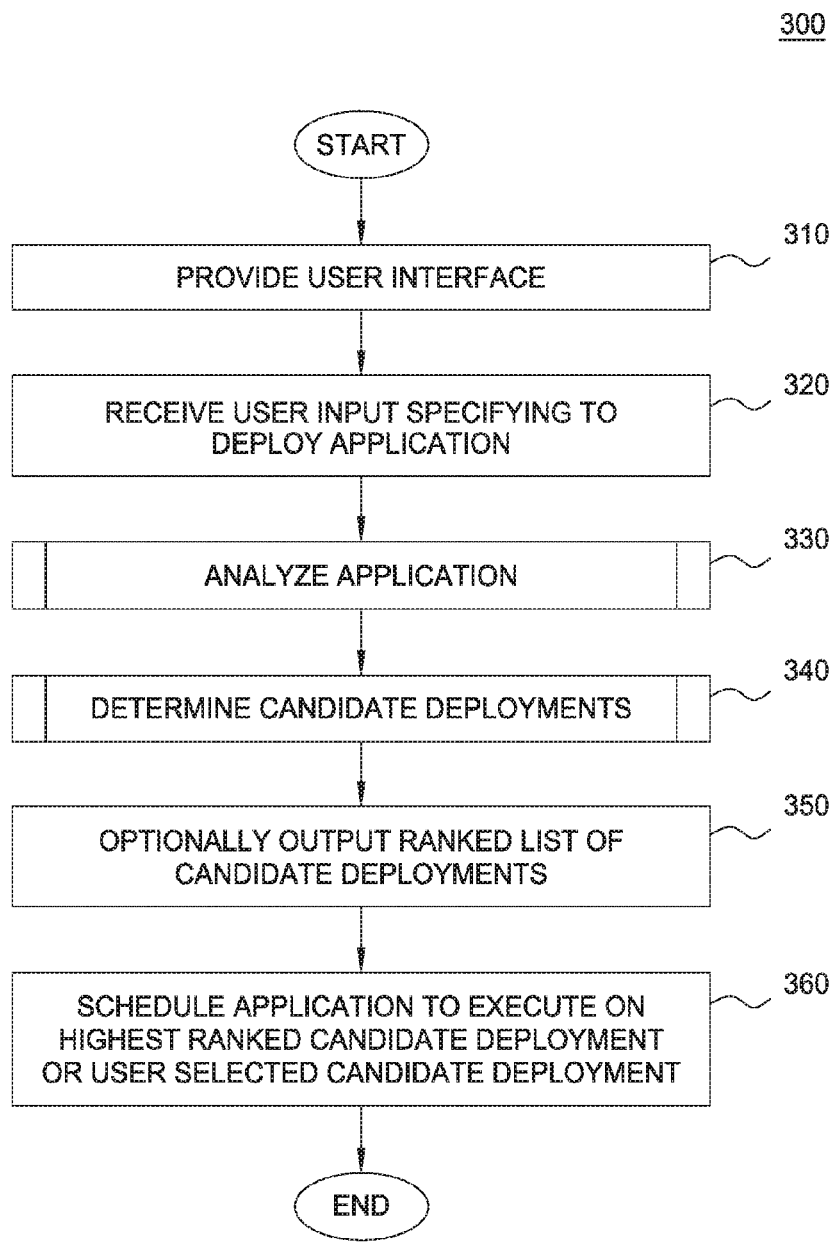
FIG. 3 is a flow chart illustrating a method to provide automatic, analysis-based scheduling of jobs to appropriate cloud resources, according to one embodiment.

FIG. 3 is a flow chart illustrating a method 300 to provide automatic, analysis-based scheduling of jobs to appropriate cloud resources, according to one embodiment. As shown, the method 300 begins at step 300, where the scheduler 211 provides a user interface, such as the GUI 100, which allows users to submit jobs/applications for deployment in the cloud. The user interface allows users to easily make use of cloud resources without requiring the users to have a more intimate knowledge of the cloud topology and environment. At step 320, the scheduler 211 may receive user input specifying to deploy an application to the cloud. Generally, the user may submit any type of object for deployment in the cloud, such as a workload, job, application, executable, binary, service, and the like. At step 330, described in greater detail with reference to FIG. 4, the scheduler 211 may analyze the application. Generally, the scheduler 211 may determine the type of application, the target operating system it is designed to execute in, and any other relevant attributes of the application (and its dependencies). At step 340, described in greater detail with reference to FIG. 5, the scheduler 211 may determine a set of candidate deployments for the application. For example, the scheduler 211 may determine that the application is available in Linux, Windows, and a plurality of other formats. The scheduler 211 may score each of the candidate deployments to determine the best deployment for the application. At step 350, the scheduler 211 may optionally output a ranked list of each of the candidate deployments (or a subset thereof) to the user. The list may be ranked based on the score for each candidate deployment. Doing so may afford the user the opportunity to select one of the candidate deployments prior to deploying the application. However, in at least one embodiment, the scheduler 211 automatically selects the highest ranked candidate deployment without requiring user input. At step 360, the scheduler 211 schedules the application to execute on the highest ranked candidate deployment or the user-selected candidate deployment.

Figure 4:
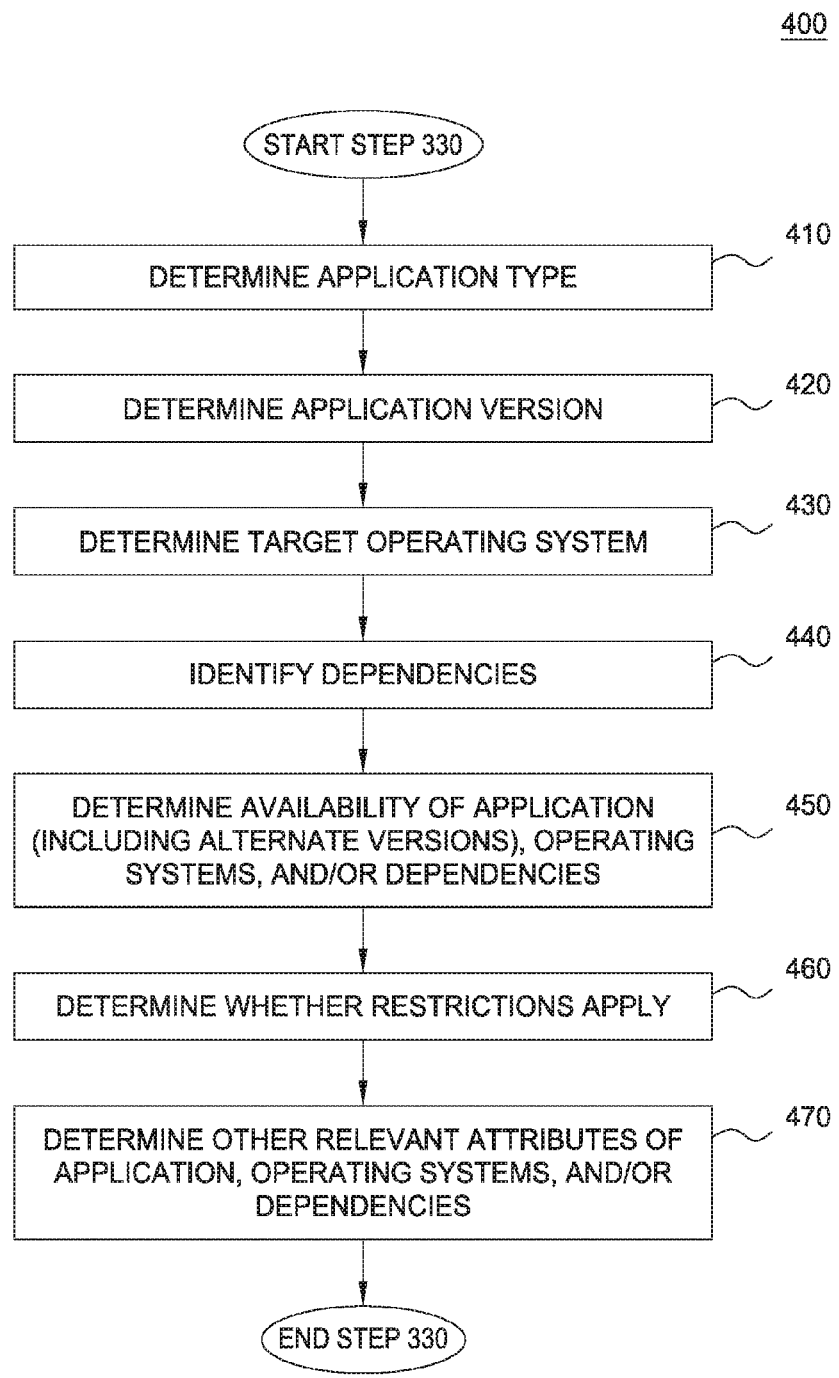
FIG. 4 is a flow chart illustrating a method to analyze an application, according to one embodiment.

FIG. 4 is a flow chart illustrating a method 400 corresponding to step 330 to analyze an application, according to one embodiment. In at least one embodiment, the scheduler 211 performs the steps of the method 400. As shown, the method 400 begins at step 410, where the scheduler 211 determines the type of the application submitted by the user at step 320. The scheduler 211 may use any technique to determine the application type, such as examining the file extension, determining what operating system the executable file type is compiled for, and the like. At step 420, the scheduler 211 may determine the version of the submitted application. For example, the version of the application may be specified in the filename, as metadata in the executable/binary, or provided by the user. The scheduler 211 may also determine whether alternate versions of the application exist (e.g., by referencing the application data 212, or referencing Internet-based sources of information). At step 430, the scheduler 211 may determine the target operating system of the application. As previously indicated, by determining the application type, the scheduler 211 may also determine which operating system the application is compiled for. The scheduler 211 may also determine target operating systems for alternate versions of the application.

At step 440, the scheduler 211 may identify any dependencies of the application, such as libraries, other applications, scripts, and the like. In at least one embodiment, the application executable or package may specify the dependencies. In at least one other embodiment, the scheduler 211 may reference the symbol table for the binary file to determine the libraries (dependencies) that must be installed on the target virtual machine for the application. At step 450, the scheduler 211 may determine the availability of the application, target operating systems, and/or dependencies. Generally, the scheduler 211 may determine whether the application, operating systems, and dependencies are locally available, available for download, or unavailable. At step 460, the scheduler 211 may determine whether restrictions apply. For example, corporate restrictions may require specific versions of an application, operating system, or dependency. Similarly, the applications, operating systems, and dependencies may require specific versions for interoperability. For example, the latest version of application Z may require a previous version of operating system A. At step 470, the scheduler 211 may determine any other relevant attributes of the application, operating systems, and/or dependencies. For example, the scheduler 211 may determine when the last time an application, operating systems, and/or dependencies were updated. The scheduler 211 may also consider the number of bugs reported for the application, operating systems, and/or dependencies. The scheduler 211 may also consider ease of installation of the application, operating systems, and/or dependencies. For example, modern tools for easily deploying the application, operating system, and/or dependencies may exist for some versions, but not others.

Figure 5:
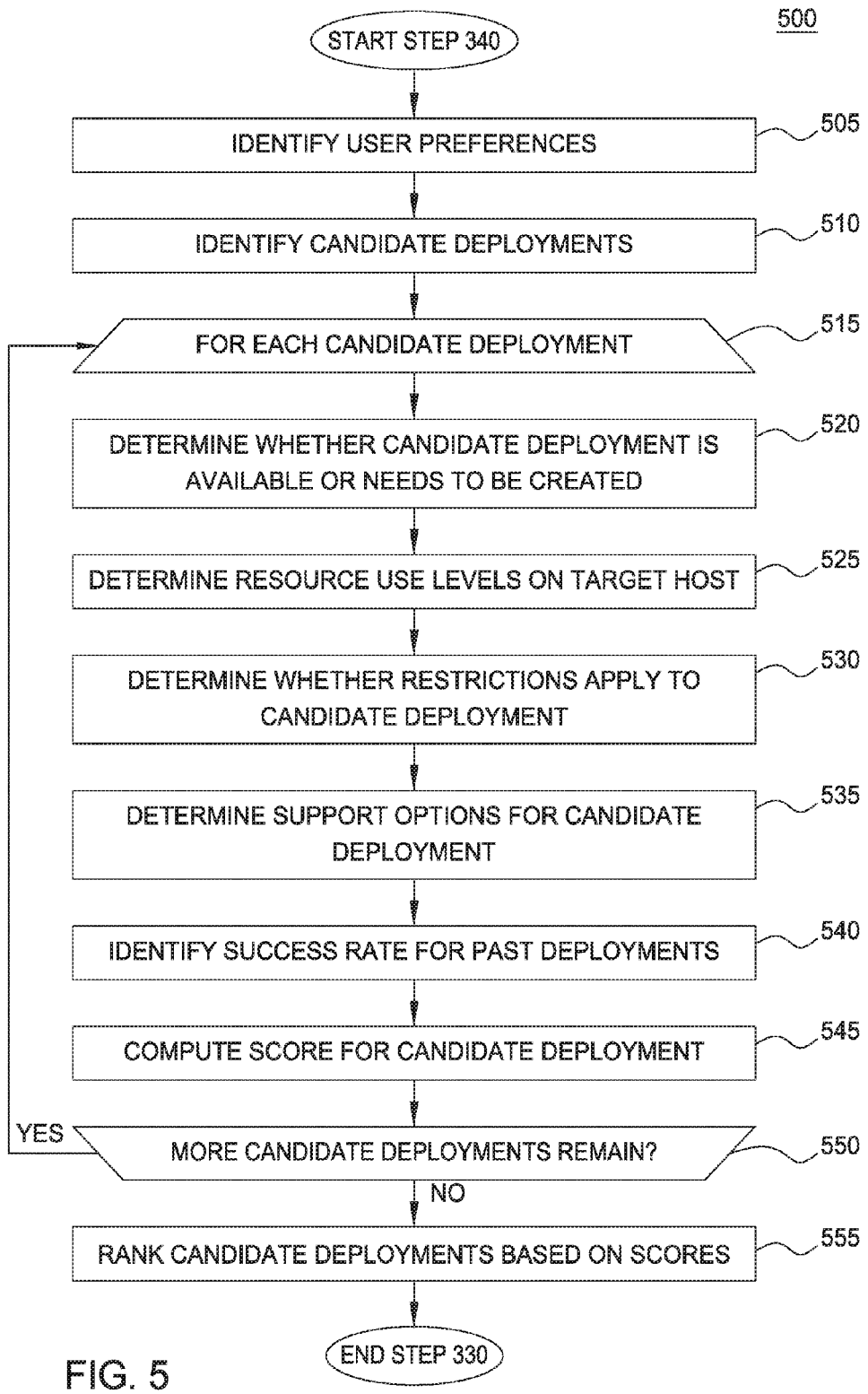
FIG. 5 is a flow chart illustrating a method to determine candidate deployments, according to one embodiment.

FIG. 5 is a flow chart illustrating a method 500 corresponding to step 340 to determine candidate deployments, according to one embodiment. In at least one embodiment, the scheduler 211 performs the steps of the method 500. As shown, the method 500 begins at step 505, where the scheduler 211 identifies user deployment preferences from the user data 213. For example, the user may have an explicit preference defined for the AIX operating system. The scheduler 211 may use the user preferences when determining the best deployment for the application (e.g., by weighting the scores for each deployment based on the user preferences). At step 510 the scheduler 211 may identify a plurality of candidate deployments. The scheduler 211 may generally identify existing deployments (e.g., virtual machines) in the cloud, as well as create a list of new deployments that may be deployed on any number of hosts. The scheduler 211, in generating the candidate deployments, may match different versions of the application to the respective operating system (e.g., virtual machine). Therefore, for example, a first candidate deployment may pair a Linux version of the application with an AIX virtual machine. At step 515, the scheduler 211 executes a loop including steps 520-545 for each candidate deployment identified at step 510.

At step 520, the scheduler 211 may determine whether the current candidate deployment is currently available or is not available and needs to be created. For example, it may be faster to deploy the application to an existing virtual machine in the cloud, as deploying a new virtual machine may introduce additional delays. Therefore, the scheduler 211 may weigh existing deployments greater than new deployments when computing the score for the candidate deployment. At step 525, the scheduler 211 may determine the resource use levels on the target host machine. If the resource use levels are high, then the scheduler 211 may wish to avoid choosing the current candidate deployment in favor of a candidate deployment targeting a host with more available resources. At step 530, the scheduler 211 may determine whether restrictions apply to the current candidate deployment. For example, if a dependency is subject to a corporate restriction, the scheduler 211 may need to retrieve and install a permitted version of the dependency on the target virtual machine, delaying the total deployment time for the application. Therefore, if the candidate deployment is subject to restrictions, the scheduler 211 may reduce the score for the candidate deployment.

At step 535, the scheduler 211 may determine support options for the candidate deployment. For example, if an installation cookbook exists for the current candidate deployment, the scheduler 211 may increase the score for the candidate deployment. At step 540, the scheduler 211 may reference the deployment data 214 to determine the success rate for past deployments of the current candidate deployment. Generally, the scheduler 211 may prefer to select candidate deployments that were successful in the past. Therefore, the scheduler 211 may increase the score for successful deployments and decrease the score for unsuccessful previous deployments. At step 545, the scheduler 211 may compute a score for the current candidate deployment based on one or more of the determinations made at steps 505 and 520-540. The scheduler 211 may further base the score on any attribute of the application, operating system, and/or dependencies. The scheduler 211 may use any suitable algorithm to compute the score. At step 550, the scheduler 211 determines whether any additional candidate deployments remain. If more candidate deployments remain, the scheduler 211 returns to step 515. Otherwise, the method proceeds to step 555, where the scheduler 211 ranks the candidate deployments based on the scores computed at step 545.

Advantageously, embodiments disclosed herein provide multiple levels of analysis of an application, and use these levels of analysis to deploy the application in a cloud computing environment. The scheduler disclosed herein considers the application type, target operating system, dependencies, and a plurality of other factors to choose the best deployment for the application. Doing so allows users to easily deploy applications to a cloud computing environment with little knowledge of the details of the cloud.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
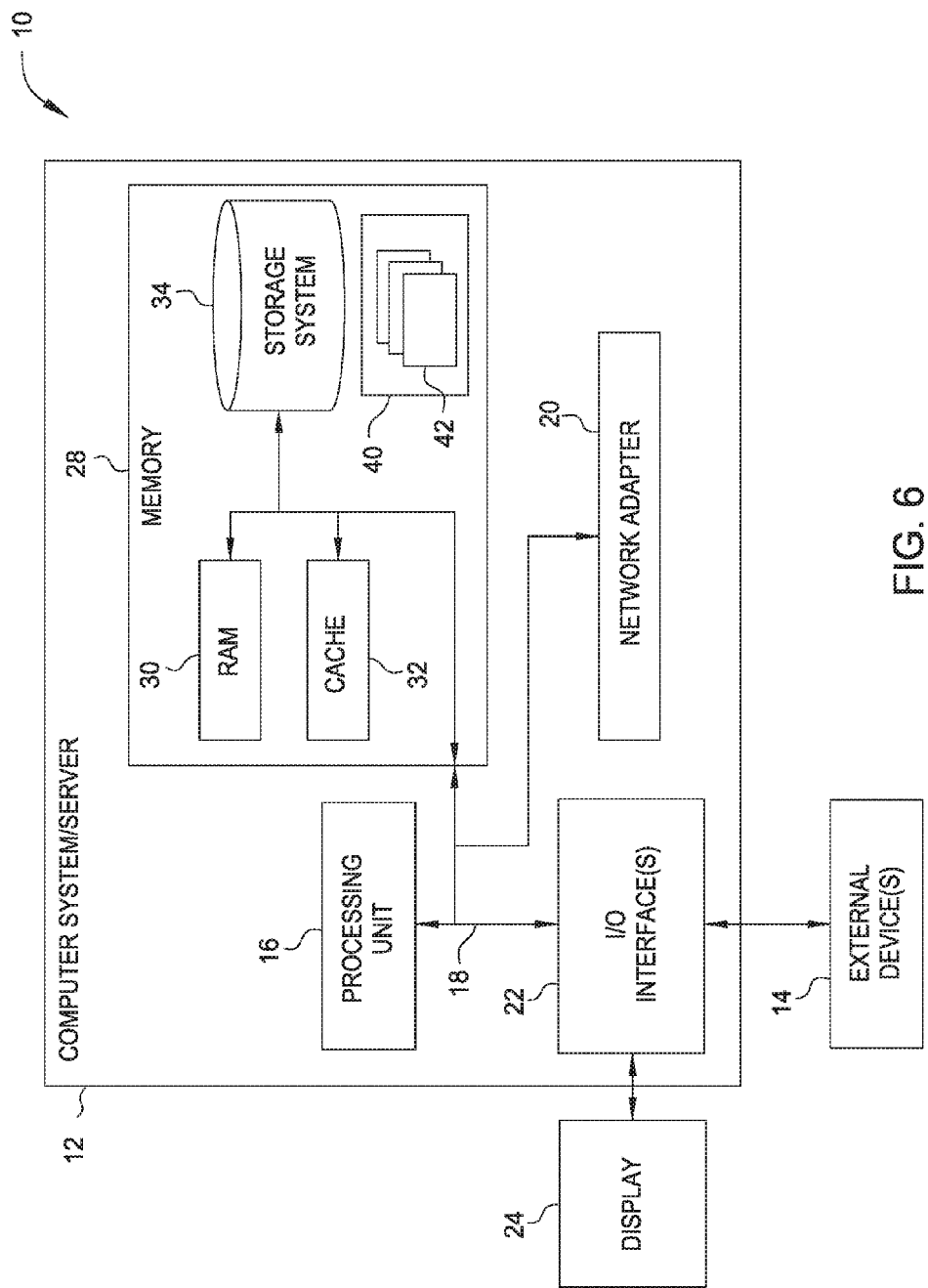
FIG. 6 depicts a cloud computing node according to one embodiment.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 7:
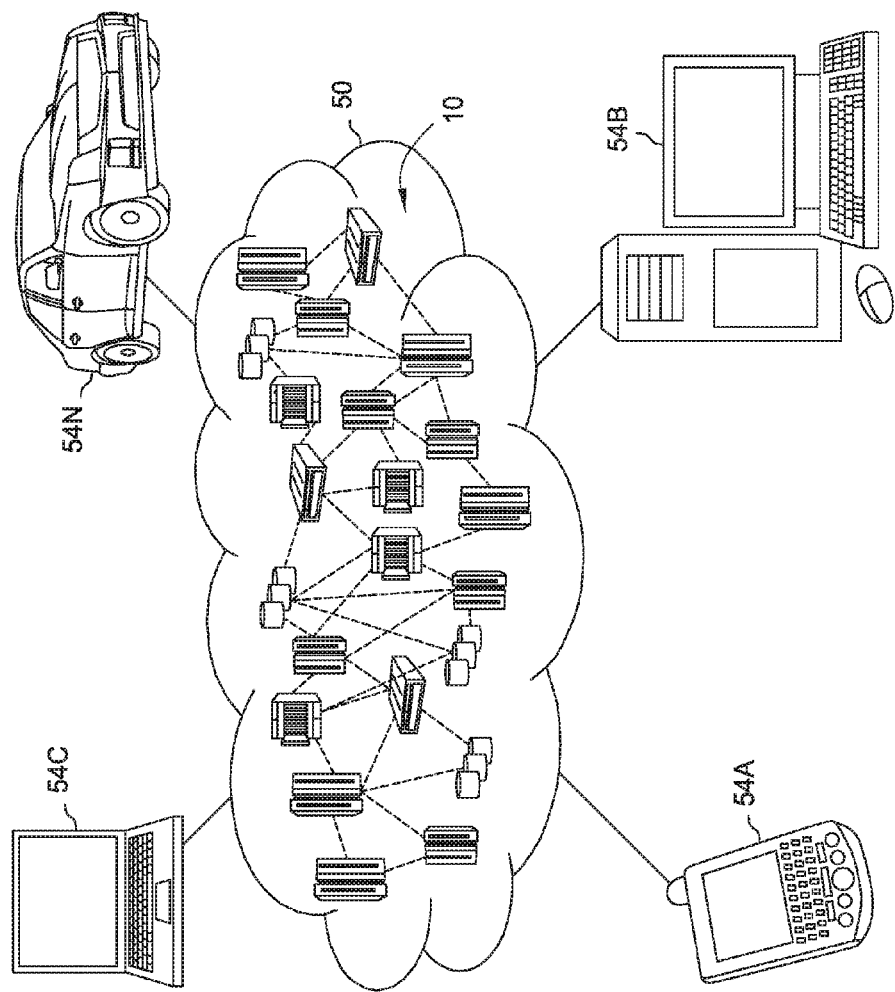
FIG. 7 depicts a cloud computing environment according to one embodiment.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
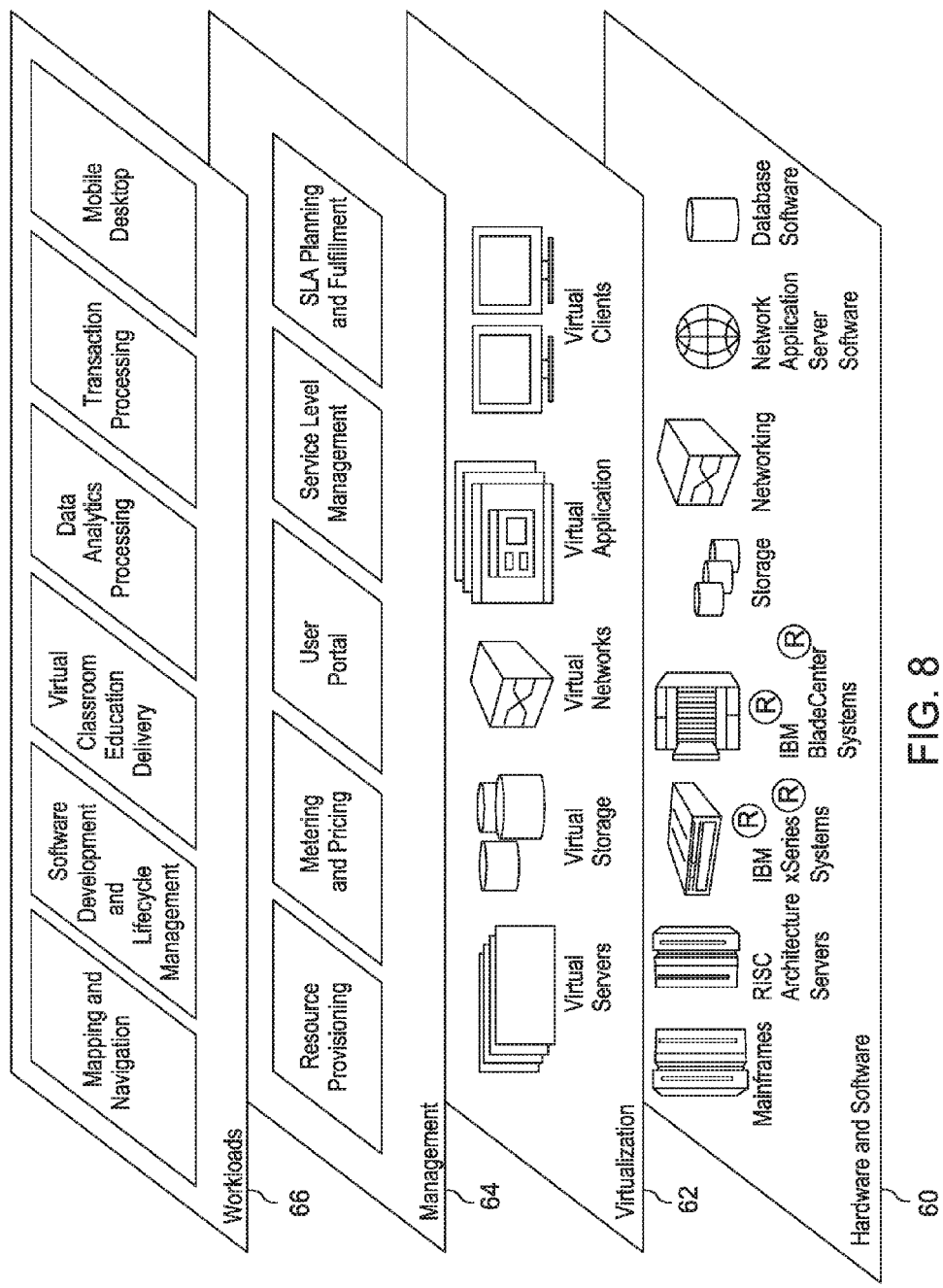
FIG. 8 depicts abstraction model layers according to one embodiment.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, Web Sphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. The resource provisioning may be based on an analysis of the requested job/application and the cloud computing environment itself, as described above. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   identifying a set of attributes of an application specified in a request to deploy the application in a cloud computing environment, wherein the set of attributes of the application comprise: (i) a target operating system the application is compiled to execute in, (ii) a level of support for each of a plurality of versions of the application, and (iii) a restriction against using at least one of the plurality of versions of the application in the cloud computing environment;
   identifying historical data reflecting a plurality of past deployments of the application in the cloud computing environment;
   determining a set of dependencies for the application;
   selecting a first virtual machine format, of a plurality of virtual machine formats, based on the set of attributes, the historical data, and the set of dependencies; and
   deploying the application in a first virtual machine of the first virtual machine format executing the target operating system on a host in the cloud computing environment.

2. The method of claim 1, wherein the historical data comprises: (i) a number of times each of a plurality of users have selected each of the plurality of virtual machine formats to host the application, and (ii) an indication of success for each of the plurality of past deployments of the application in the cloud computing environment.

3. The method of claim 2, wherein the set of attributes of the application further comprise a current version of the application.

4. The method of claim 1, further comprising:
   identifying a set of attributes for each dependency in the set of dependencies, wherein the set of attributes for each dependency comprise: (i) an amount of time that has elapsed since the dependency was updated, (ii) a restriction against using the dependency in the cloud computing environment, (iii) an availability of the dependency, wherein the first virtual machine format is further selected based on the set of attributes for each dependency.

5. The method of claim 1, wherein the application does not specify the set of dependencies, the method further comprising:
   determining the set of dependencies based on a symbol table of a binary package for the application; and
   upon determining that a first dependency of the set of dependencies is not installed on the first virtual machine, installing the first dependency on the first virtual machine.

6. The method of claim 1, the request is received from a user, the method further comprising prior to selecting the first virtual machine format:
   outputting a subset of the plurality of virtual machine formats to the user, wherein the subset of the plurality of virtual machine formats are ranked based on a respective deployment score; and
   receiving user selection of the first virtual machine format.

7. A system, comprising:
   one or more computer processors; and
   a memory containing a program which when executed by the processors performs an operation comprising:
      identifying a set of attributes of an application specified in a request to deploy the application in a cloud computing environment, wherein the set of attributes of the application comprise: (i) a target operating system the application is compiled to execute in, (ii) a level of support for each of a plurality of versions of the application, and (iii) a restriction against using at least one of the plurality of versions of the application in the cloud computing environment;
      identifying historical data reflecting a plurality of past deployments of the application in the cloud computing environment;
      determining a set of dependencies for the application;
      selecting a first virtual machine format, of a plurality of virtual machine formats, based on the set of attributes, the historical data, and the set of dependencies; and
      deploying the application in a first virtual machine of the first virtual machine format executing the target operating system on a host in the cloud computing environment.

8. The system of claim 7, wherein the historical data comprises: (i) a number of times each of a plurality of users have selected each of the plurality of virtual machine formats to host the application, and (ii) an indication of success for each of the plurality of past deployments of the application in the cloud computing environment.

9. The system of claim 8, wherein the set of attributes of the application further comprise: (i) a current version of the application.

10. The system of claim 7, the operation further comprising:
    identifying a set of attributes for each dependency in the set of dependencies, wherein the set of attributes for each dependency comprise: (i) an amount of time that has elapsed since the dependency was updated, (ii) a restriction against using the dependency in the cloud computing environment, (iii) an availability of the dependency, wherein the first virtual machine format is further selected based on the set of attributes for each dependency.

11. The system of claim 7, wherein the application does not specify the set of dependencies, the operation further comprising:
    determining the set of dependencies based on a symbol table of a binary package for the application; and
    upon determining that a first dependency of the set of dependencies is not installed on the first virtual machine, installing the first dependency on the first virtual machine.

12. The system of claim 7, the request is received from a user, the operation further comprising prior to selecting the first virtual machine format:
    outputting a subset of the plurality of virtual machine formats to the user, wherein the subset of the plurality of virtual machine formats are ranked based on a respective deployment score; and
    receiving user selection of the first virtual machine format.

13. A computer program product, comprising:
a computer-readable storage medium having computer-readable program code embodied therewith, the computer-readable program code executable by one or more computer processors to perform an operation comprising:
- identifying a set of attributes of an application specified in a request to deploy the application in a cloud computing environment, wherein the set of attributes of the application comprise: (i) a target operating system the application is compiled to execute in, (ii) a level of support for each of a plurality of versions of the application, and (iii) a restriction against using at least one of the plurality of versions of the application in the cloud computing environment;
- identifying historical data reflecting a plurality of past deployments of the application in the cloud computing environment;
- determining a set of dependencies for the application;
- selecting a first virtual machine format, of a plurality of virtual machine formats, based on the set of attributes, the historical data, and the set of dependencies; and
- deploying the application in a first virtual machine of the first virtual machine format executing the target operating system on a host in the cloud computing environment.

14. The computer program product of claim 13, wherein the historical data comprises: (i) a number of times each of a plurality of users have selected each of the plurality of virtual machine formats to host the application, and (ii) an indication of success for each of the plurality of past deployments of the application in the cloud computing environment.

15. The computer program product of claim 14, wherein the set of attributes of the application further comprise a current version of the application.

16. The computer program product of claim 13, the operation further comprising:
- identifying a set of attributes for each dependency in the set of dependencies, wherein the set of attributes for each dependency comprise: (i) an amount of time that has elapsed since the dependency was updated, (ii) a restriction against using the dependency in the cloud computing environment, (iii) an availability of the dependency, wherein the first virtual machine format is further selected based on the set of attributes for each dependency.

17. The computer program product of claim 13, wherein the application does not specify the set of dependencies, the operation further comprising:
- determining the set of dependencies based on a symbol table of a binary package for the application; and
- upon determining that a first dependency of the set of dependencies is not installed on the first virtual machine, installing the first dependency on the first virtual machine.

* * * * *